(No Model.)
B. C. COPELAND.
Toaster.
No. 242,276.  Patented May 31, 1881.
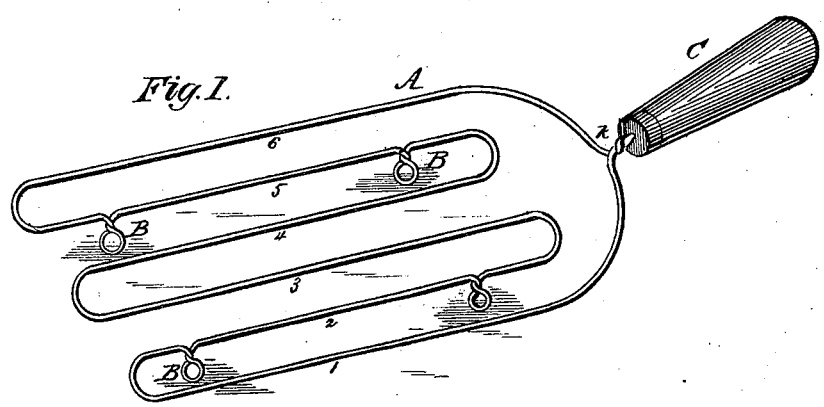
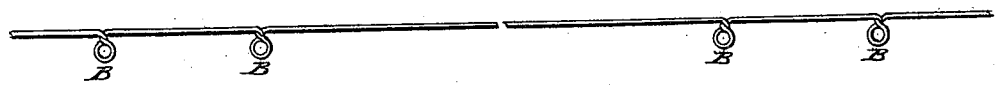
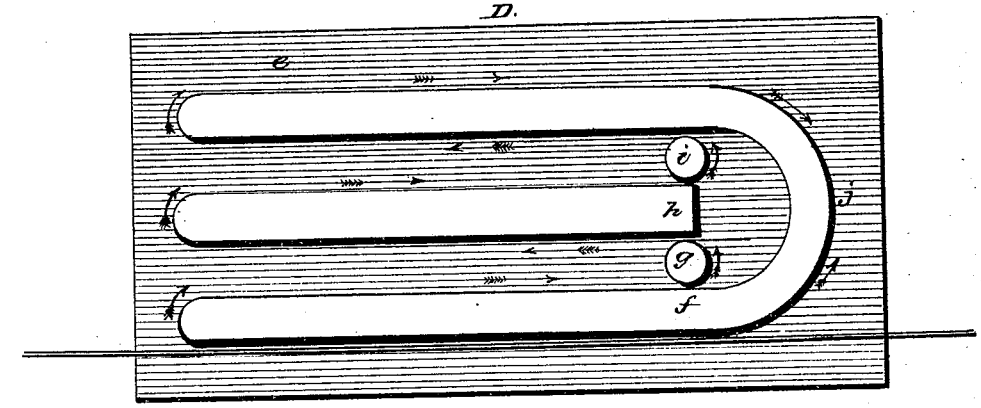
Witnesses
Fred G. Dieterich
B. L. Dieterich
Inventor
Barbara C. Copeland
By J. J. Johnston
her attorney

UNITED STATES PATENT OFFICE.

BARBARA C. COPELAND, OF COLUMBIANA, OHIO.

TOASTER.

SPECIFICATION forming part of Letters Patent No. 242,276, dated May 31, 1881.

Application filed December 23, 1880. (No model.)

*To all whom it may concern:*

Be it known that I, BARBARA C. COPELAND, of Columbiana, in the county of Columbiana and State of Ohio, have invented a new and useful Improvement in Toasters; and I do hereby declare that the following is a full, clear, and exact description thereof, reference being had to the accompanying drawings, and to the letters of reference marked thereon.

My invention relates to an improvement in device for toasting bread; and it consists of a series of bars arranged on a horizontal plane and supported upon feet, said bars, feet, and handle, or a tang for entering a wooden handle, being constructed of a single piece of wire, as will hereinafter more fully appear.

To enable others skilled in the art with which my invention is most nearly connected to make and use it, I will proceed to describe its construction and operation.

In the accompanying drawings, which form part of this specification, Figure 1 is a perspective view of my improvement in toasters. Fig. 2 is a side view of the wire with feet for the toaster formed thereon. Fig. 3 is a top view or plan of a form for bending the wire thereon in the operation of constructing my improved toaster.

In the accompanying drawings, similar letters of reference refer to the same parts in the several figures of said drawings.

A represents the toaster furnished with feet B and a handle, C. Said toaster is constructed of a single piece of wire in the following manner: I take a piece of straight wire and by means of a suitable tool form the feet B. I then form the bars 1, 2, 3, 4, 5, and 6 on the form D, (shown in Fig. 3,) which form consists of a metal plate, $e$, having projections $f$, $g$, $h$, and $i$. The wire, after the feet B are formed, is laid against the projection $f$, as shown in Fig. 3, and is bent around the several projections, the arrows representing the course of the wire in the bending of it. The two ends of the wire are brought together at the point $j$ of the projection and twisted so as to form a handle or a tang, $k$, for a wooden handle, as shown in Fig. 1. In the process of bending the wire the feet B are uppermost.

In toasting bread the feet B rest on the stove-top, and bread is laid upon the bars 1 to 6.

Having thus described my improvement, what I claim as of my invention is—

A toaster consisting of a series of bars arranged on a horizontal plane and supported upon feet, said bars, feet, and a handle or a tang for a handle constructed of a single piece of wire, substantially as herein described.

BARBARA C. COPELAND.

Witnesses:
WILLIAM J. HUSTON,
JOHN G. BEATTY.